United States Patent
Qian et al.

(10) Patent No.: US 12,307,307 B2
(45) Date of Patent: May 20, 2025

(54) DECAP TIME AND PRINTING DATA

(71) Applicant: Hewlett-Packard Development Company, L.P., Spring, TX (US)

(72) Inventors: Li Qian, Sant Cugat del Valles (ES); Maurizio Bordone, Sant Cugat del Valles (ES); Carles Carmona Calpe, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 77 days.

(21) Appl. No.: 18/258,635

(22) PCT Filed: Dec. 22, 2020

(86) PCT No.: PCT/US2020/066582
§ 371 (c)(1),
(2) Date: Jun. 21, 2023

(87) PCT Pub. No.: WO2022/139806
PCT Pub. Date: Jun. 30, 2022

(65) Prior Publication Data
US 2024/0296301 A1    Sep. 5, 2024

(51) Int. Cl.
| | |
|---|---|
| H04N 1/04 | (2006.01) |
| G06K 15/02 | (2006.01) |
| G06K 15/10 | (2006.01) |
| G06K 15/22 | (2006.01) |
| B29C 64/393 | (2017.01) |
| B33Y 50/02 | (2015.01) |

(52) U.S. Cl.
CPC ....... *G06K 15/1825* (2013.01); *G06K 15/027* (2013.01); *G06K 15/102* (2013.01); *G06K 15/1823* (2013.01); *G06K 15/22* (2013.01); *B29C 64/393* (2017.08); *B33Y 50/02* (2014.12)

(58) Field of Classification Search
USPC .......................................... 358/1.1, 1.5, 1.8
See application file for complete search history.

(56) References Cited

U.S. PATENT DOCUMENTS

| | | | |
|---|---|---|---|
| 6,575,545 | B2 | 6/2003 | Bruch et al. |
| 8,272,708 | B2 | 9/2012 | Silverbrook et al. |
| 9,533,513 | B1 * | 1/2017 | Qian ..................... B41J 2/2132 |
| 9,844,935 | B2 | 12/2017 | Toussaint et al. |

(Continued)

FOREIGN PATENT DOCUMENTS

| | | |
|---|---|---|
| WO | 2013/162617 A1 | 10/2013 |
| WO | 2019/135777 A1 | 7/2019 |

*Primary Examiner* — Cheukfan Lee
(74) *Attorney, Agent, or Firm* — Jordan IP Law, LLC

(57) ABSTRACT

Examples include a method for mitigating decap in a printing system that comprises nozzles, in which printing data associated to a graphical representation and that comprise pixel data points are received. Some data points are associated with a corresponding nozzle and a corresponding direction of movement and at least one specific data point is associated with a specific direction of movement and a specific nozzle which has a decap time below a first predetermined threshold. The received printing data is modified by displacing the printing data of the specific data point in a direction opposite to the specific direction of movement in order to compensate for the decap time.

15 Claims, 3 Drawing Sheets

(56) References Cited

U.S. PATENT DOCUMENTS

| | | |
|---|---|---|
| 10,343,417 B2 | 7/2019 | Sender Beleta et al. |
| 2003/0048316 A1 | 3/2003 | Bruch et al. |
| 2015/0324996 A1 | 11/2015 | Rius Rossell et al. |
| 2018/0056649 A1 | 3/2018 | Taff et al. |
| 2018/0272560 A1* | 9/2018 | Abbott, Jr. .............. B28B 1/001 |

* cited by examiner

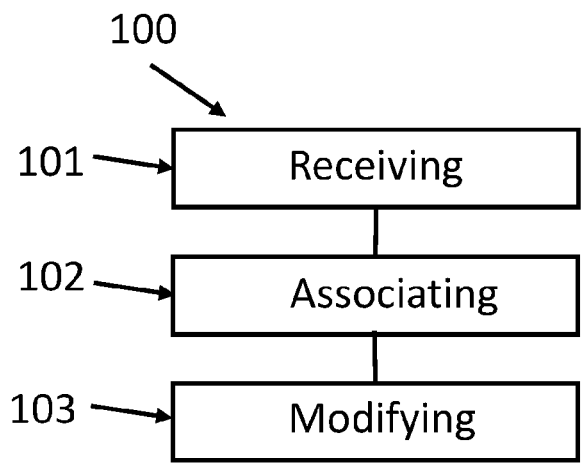
Fig. 1
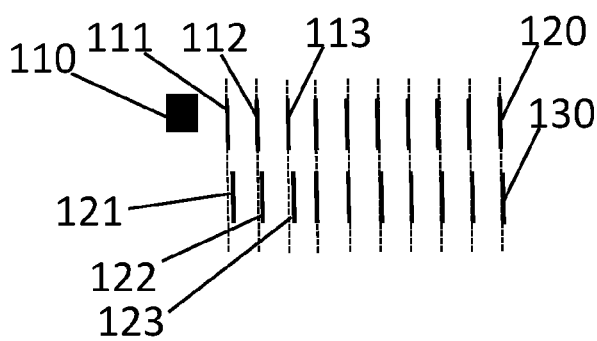
Fig. 2
  
Fig. 3A            Fig. 3B            Fig. 3C
  
Fig. 4A            Fig. 4B            Fig. 4C

DECAP TIME AND PRINTING DATA

BACKGROUND

This disclosure generally relates to a printing system. A printing system may allow printing text or images on a print substrate. A printing system may also allow printing three dimensional objects. The printing system may comprise printheads provided with nozzles that fire a printing fluid. The printing quality may vary over time or from printing system to printing system, potentially resulting in lower printing quality.

BRIEF DESCRIPTION OF THE DRAWINGS

Various example features will be apparent from the detailed description which follows, taken in conjunction with the accompanying drawings, wherein:

FIG. 1 is a block diagram of a first example method for mitigating decap in a printing system according to the present disclosure.

FIG. 2 is a schematic illustration of an example diagnostic plot.

FIG. 3A is a schematic illustration of a plurality of pixel data points associated to an example of graphical representation.

FIG. 3B is a schematic illustration of the plurality of pixel data points of the graphical representation of FIG. 3A modified by the example method of FIG. 1 in a first configuration.

FIG. 3C is a schematic illustration of printing of the graphical representation of FIG. 3A after being modified by the example method of FIG. 1 in the first configuration.

FIG. 4A is a schematic illustration of a plurality of pixel data points associated to an example of graphical representation.

FIG. 4B is a schematic illustration of the plurality of pixel data points of the graphical representation of FIG. 4A modified by the example method of FIG. 1 in a second configuration.

FIG. 4C is a schematic illustration of a printing of the graphical representation of FIG. 4A after being modified by the example method of FIG. 1 in the second configuration.

DETAILED DESCRIPTION

Figure 5:
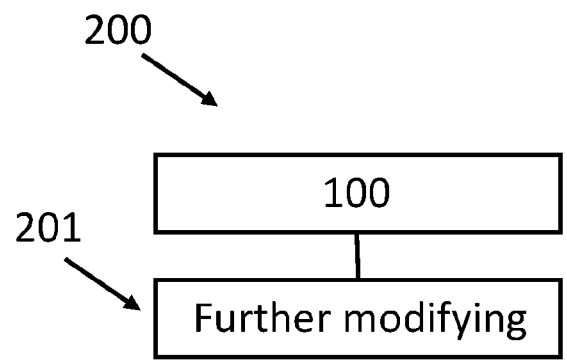
FIG. 5 is a block diagram of a second example method for mitigating decap in a printing system according to the present disclosure.

Lower printing quality may be due to a decap issue on nozzles of a printing system. Decap should be understood as an inability to fire, or a worse firing, of nozzles after a certain period of time of inactivity and exposition to an open atmosphere of the nozzle or nozzles concerned. By "worse firing", it can be understood that nozzles fire with loss of velocity that results on misdirection. The period of inactivity after which nozzles are unable to fire, or fire incorrectly, is called decap time. In other words, decap time corresponds to a maximum time during which a nozzle may remain decap without having a detrimental effect on printing quality. Decap may be due to an evaporation of water or solvent in printing fluid. Water or solvent evaporation increases viscosity of printing fluids and accelerates their drying, such that decap time is reduced. Adding humectants to printing fluids may then be useful to limit decap issues. Ensuring permanent micro-circulation of printing fluid in the printhead may also help to keep the viscosity of the printing fluids relatively constant, thereby limiting decap issues. Decap issues may also be limited by changing the position of the text, image or object to be printed such that the number of nozzles presenting decap issues involved in printing is reduced. Further improving decap performances of printing systems forms a foundation of the present disclosure.

The present disclosure indeed proposes compensating decap issues by proactively and preventively modifying printing data in printing data files. Printing data associated to a graphical representation is received. While printing such received printing data directly would, due to decap issues, produce an actual print which would suffer from decap issues, the method hereby proposed preventively modifies the printing data in order to compensate such decap issues. The data which will actually get printed thereby differs from the printing data received, as will be explained in this disclosure.

FIG. 1 illustrates an example method 100 for mitigating decap in a printing system. The printing system can include a fluid ejection assembly, such as a printhead assembly, and a fluid supply assembly. The printing system can also include a carriage assembly, a print substrate transport assembly, a service station assembly, and an electronic controller.

In an example, the printing system is a dye-sublimation printing system, for example a dye-sublimation ink-jet printing system. The dye-sublimation printing system can include a heating source. The heating source is for example a narrow band radiation source. The narrow band radiation source may be a visible light LED lamp or an Ultraviolet (UV) radiation LED lamp. The narrow band radiation source may also be a narrow band radiation source selected to match with an absorption wavelength of colorants of a printing fluid transferred onto the print substrate, or with an absorption wavelength of the print substrate. The heating source allows sublimating, i.e. transforming from solid to gas, the printing fluid transferred onto the print substrate. Once in a gas state, the gas may penetrate the substrate and become part of it such that the print substrate is pigmented. In an example, the dye-sublimation printing system is a scanning printhead printing system. In an example, the dye-sublimation printing system is a page-wide array printing system. Decap issues may be particularly acute in dye-sublimation printing system.

In an example, the printing system is a three dimensional (3D)) printing system. The 3D dimensional system may be a scanning printhead printing system.

In an example, the printing system is an inkjet printing system. In an example, the inkjet printing system is a scanning printhead printing system. In an example, the printing fluidjet printing system is a page-wide array printing system. In an example, the printing fluidjet printing system is a three dimensional (3D) printing system. The 3D dimensional system may be a scanning printhead printing system or a page-wide array printing system.

An example printhead assembly can include a printhead or fluid ejection device which ejects drops of printing fluid or printing fluid through a plurality of orifices or nozzles. In one example, the printing system is a thermal inkjet printing system whereby the ejection of a drop is using the heat produced by a resistor. In another example, the printing system is a piezo inkjet printing system whereby the ejection of a drop is using the mechanical energy produced by a piezo electrical element. In one example, the drops are directed toward the substrate, such as a print substrate, so as to print onto the print substrate. A print substrate includes any type of suitable sheet material, such as paper, card stock, transparencies, Mylar, fabric, and the like. In one example, nozzles are arranged in a column such that properly sequenced ejection of printing fluid from nozzles causes characters, symbols, and/or other graphics or images to be printed upon print substrate as printhead assembly and print substrate are moved relative to each other.

An example fluid supply assembly supplies printing fluid to the printhead assembly and includes a reservoir for storing printing fluid. As such, in one example, printing fluid flows from a reservoir to the printhead assembly. In one example, the printhead assembly and the fluid supply assembly are housed together in an inkjet or fluidjet print cartridge. In another example, the fluid supply assembly is separated from the printhead assembly and supplies printing fluid to the printhead assembly through an interface connection or physical interface connection such as a supply tube.

An example carriage assembly positions the printhead assembly relative to a print substrate transport assembly. The print substrate transport assembly positions the print substrate relative to the printhead assembly. Thus, a print zone is defined adjacent to nozzles in an area between the printhead assembly and the print substrate. In one example, the printhead assembly is a scanning type printhead assembly such that the carriage assembly moves the printhead assembly relative to the print substrate transport assembly. In another example, the printhead assembly is a non-scanning type printhead assembly such that the carriage assembly fixes the printhead assembly at the prescribed position relative to the print substrate transport assembly. An example of non-scanning type printhead is a page-wide array printer printhead. A carriage speed corresponds to a speed at which the carriage assembly is able to position the printhead assembly relative to the print substrate transport assembly.

An example service station assembly provides for spitting, wiping, capping, and/or priming of a printhead assembly in order to maintain a functionality of the printhead assembly and, more specifically, of nozzles. For example, the service station assembly may include a rubber blade or wiper which is periodically passed over the printhead assembly to wipe and clean nozzles of excess printing fluid. In addition, the service station assembly may include a cap which covers the printhead assembly to protect nozzles from drying out during periods of non-use. In addition, the service station assembly may include a spittoon or a secondary or additional spittoon into which the printhead assembly ejects printing fluid to insure that a reservoir maintains an appropriate level of pressure and fluidity, and help avoid that nozzles do clog or weep excessively. Functions of the service station assembly may include relative motion between the service station assembly and the printhead assembly. During operation, clogs in the printhead can be periodically cleared by firing a number of drops of printing fluid through each of the nozzles in a process named "spitting," with the waste printing fluid being collected in a spittoon reservoir portion of the service station. In another example the service station comprises a web wipe where printheads are cleaned through a web of cloth. Such cloth may or may not be impregnated with a fluid participating in the cleaning process of the nozzles. An example of such fluid is low molecular weight PEG (polyethylene glycol).

An example electronic controller communicates with the printhead assembly, the carriage assembly, the print substrate transport assembly, and the service station assembly. Thus, in one example, when the printhead assembly is mounted in the carriage assembly, the electronic controller and the printhead assembly communicate via the carriage assembly. An example electronic controller also communicates with the fluid supply assembly such that a new (or used) printing fluid supply may be detected, and a level of printing fluid in the printing fluid supply may be detected. In an example, the controller is an electronic controller which includes a processor and a memory or storage component and other electronic circuits for communication including receiving and sending electronic input and output signals.

An example electronic controller receives data from a host system, such as a computer, and may include memory for temporarily storing data. Data may be sent to the printing system along an electronic, infrared, optical or other information transfer path. Data represent, for example, a document and/or file to be printed. As such, data form a print job for an printing fluidjet printing system and include print job commands and/or command parameters.

The method 100 for mitigating decap comprises in block 101 receiving printing data associated to a graphical representation. The printing data may correspond to a bitmap of the graphical representation. The bitmap is also called "raster image". In the raster image, the graphical representation is converted to pixel patterns that approximate the graphical representation shape. In an example, the raster image is divided into a plurality of rows and columns of pixel data points. The printing data comprises therefore pixel data points. A size of each pixel data point is defined by a number of bits comprised in each pixel data point. The number of bits per pixel data point can determine a brightness or colour assigned to each pixel data point. In black and white printing, the size of each pixel data point can be of one bit that indicates whether or not the pixel data point is to be printed in black. In colour printing, the image can include four colour separations, so that the size of each pixel data point is of at least four bits. The four colour separations may include Cyan (C), Magenta (M), Yellow (Y) and Black (K). A format of the raster image may be Tagged Image File Format (TIF or TIFF), Joint Photographic Experts Group (JPEG), Graphics Interchange Format (GIF) or Portable Network Graphics (PNG) among others. The graphical representation comprises graphic elements. Graphic elements may comprise text or images to be printed. In one example, graphic elements include continuous lines and text character outlines. In 3D printing, the graphic elements may comprise objects to be printed. In one example, the graphical representation may be described by a page description language (PDL). Examples of page description language include, among others, Portable Document Format (PDF), Printer Command Language (PCL) or PostScript. In one example, the graphical representation may be described by a raster image with higher or lower resolution than the printing data. The graphical representation can be displayed before printing on a screen of a computer external to or integrated to the printing system. In an example, a raster image processor (RIP) transforms the graphical representation into the raster image. When the graphical representation is a raster image, the RIP may resize the graphical representation to obtain the printing data. The RIP may be implemented as a software module on the computer external to or integrated to the printing system. The printing data is for example received on the computer external to or integrated to the printing system.

The method 100 comprises in block 102 associating at least some data points of the pixel data points with a corresponding nozzle and with a corresponding direction of movement. The corresponding nozzle associated to each data point corresponds to the nozzle that is intended to fire printing fluid onto the print substrate in order to make the data point with which it is associated visible on the print substrate. In an example, each corresponding nozzle is associated with several data points of a same row or a same column of pixel data points. This configuration may be found in scanning printhead printing systems. In an example, each corresponding nozzle is associated with a single data point of each row of pixel data points. This configuration may be found in page-wide array printing systems. In an example, each corresponding nozzle is associated with a single data point of the pixel data points. This configuration may correspond to a printhead comprising a large number of nozzles or whereby reduced printing data corresponds to the graphical representation to be printed.

In an example, the corresponding direction of movement refers to a direction of movement that the carriage assembly is inducing to the printhead assembly or to a printing substrate when the corresponding nozzle fires printing fluid. Such direction of movement may be a relative direction of movement between a printhead and a printing substrate, whereby either one or both of the printing substrate or printhead may be moved. In some cases, the direction of movement of the printhead is fixed. This is for example the case of scanning printhead printing systems where the printhead assembly makes a back and forth movement during printing but nozzles fire printing fluid when the printhead moves in a single one of the backward direction or the forward direction, such that the corresponding direction of movement associated with each data point is the same for all data points. For the sake of clarity, such a scanning printhead printing system is hereinafter referred to as "unidirectional scanning printhead printing system". In page-wide array printing systems for example, there may be no movement of the printhead assembly relative to the print substrate transport assembly. The direction of movement of the printhead in page-wide array printing systems can then be considered to be always the same. Therefore, the corresponding direction of movement associated with each data point is the same for all data points. In some cases, the direction of movement of the printhead varies over time. This is for example the case of scanning printhead printing systems where the printhead assembly makes a back and forth movement and nozzles fire printing fluid when the printhead assembly moves in both the forward and the backward directions. Then, the corresponding direction of movement changes between data points. In particular, the corresponding nozzle of each data point fires printing fluid when the printhead assembly moves with a backward movement or a forward movement. A same corresponding nozzle may fire printing fluid when the printhead moves forward, when the printhead moves backward, or both. For the sake of clarity, such a scanning printhead printing system is hereinafter referred to as "bidirectional scanning printhead printing system".

In another example, the corresponding direction of movement refers to a direction of movement of the print substrate during printing. In page-wide array printing systems and in scanning printhead printing systems, print substrate may be advanced in a direction substantially perpendicular to the printhead assembly.

Associating at least some data points of the pixel data points with a corresponding nozzle and with a corresponding direction of movement allows foreseeing decap issues. First, identifying the corresponding nozzle as previously defined permits taking into account the fact that decap time may be a nozzle-dependent parameter. In fact, while decap performance tends to be highly dependent on the data to fire for each nozzle, decap time may be different for each corresponding nozzle. In some nozzles, the drying of printing fluids may be higher than in other nozzles, so that decap time is reduced. This difference in the drying of printing fluids may be due to a position of the corresponding nozzle on the printhead. Some positions of nozzles on the printhead may be more subjected to evaporation of water or solvent in printing fluids, thereby promoting drying on printing fluids. Also, a chemical composition of printing fluids may accelerate their drying. The chemical composition of printing fluids is for example not the same for each color of printing fluid available in the printing system. The different chemical composition between color printing fluids may induce that decap time in corresponding nozzles firing a color printing fluid is different from decap time in corresponding nozzles firing another color printing fluid. In an example, nozzles expelling magenta color printing fluid may have a decap time shorter than nozzles expelling black color printing fluid. Second, the corresponding direction of movement determines the effects of decap issues. When a nozzle having decap issues moves for example in a forward direction, the data point with which it is associated is printed in a forward position relative to a position on which the data point should have been printed. Likewise, when a nozzle having decap issues moves for example in a backward direction, the data point with which it is associated is printed in a backward position relative to a position on which the data point should have been printed.

In addition, associating at least some data points of the pixel data points with a corresponding nozzle and with a corresponding direction of movement allows determining if decap issues may appear because of an arrangement of the at least some data points in the raster image. In fact, as previously explained, decap may arise when nozzles sit in a non-firing state while exposed to the open atmosphere for a span of time, and subsequently receive a request to fire. If for example a first nozzle is associated with a first data point when moving in the forward direction, and with a second data point when moving in the backward direction, this first nozzle is more likely to have decap issues than a second nozzle associated with two data points when moving in the forward direction. In fact, the span of time that the first nozzle is not firing and exposed to the open atmosphere is longer than the span of time that the second nozzle is not firing and exposed to the open atmosphere. Therefore, the arrangement of data points in the raster image may have an impact on decap. In graphical representations presenting discontinuities in colored areas, decap issues may be more frequent than in graphical representations having colored areas without discontinuities, since discontinuities imply that nozzles will not fire during a span of time. "Colored areas" may be understood as areas in which the graphical representation presents a color different from white.

The association of the at least some data points of the pixel data points with the corresponding nozzle and with the corresponding direction of movement may be carried out by a computer external to or integrated to the printing system. In one example, in order to associate each data point with the corresponding direction of movement and the corresponding nozzle, the computer analyses the printing data associated with the graphical representation, as well as parameters of the printing system. Examples of parameters of the printing system that may be analysed comprise a carriage speed, a firing frequency of nozzles, a position of nozzles in the printhead or a printing system type, among others. Instructions implemented by the computer may be provided in at least one storage medium 402, illustrated in FIG. 8, in order to carry out this analysis. In another example, the computer associates the at least some data points of the pixel data points with the corresponding nozzle and with the corresponding direction of movement by analysing a printed diagnostic plot that is scanned and transferred to the computer. Details on an example printed diagnostic plot will be given hereinafter when referring to FIG. 2.

The method 100 further comprises in block 102 associating at least a specific data point of the at least some data points with a specific direction of movement and with a specific nozzle. In some cases, the specific direction of movement corresponds to a direction of movement that the carriage assembly induces to the printhead assembly when the specific nozzle fires printing fluid. In these cases, as for the corresponding direction of movement previously defined, the specific direction of movement may be fixed in unidirectional scanning printhead printing systems or in page-wide array printing systems, or it may change in bidirectional scanning printhead printing systems. In other cases, as previously said, the corresponding direction of movement refers to a direction of movement of the print substrate during printing.

It should be understood that the specific nozzle is a nozzle for which decap issues are identified. In particular, the specific nozzle is a nozzle having a decap time below a first predetermined threshold. As previously indicated, decap time may be defined as a maximum time during which a nozzle may remain decap without having a detrimental effect on printing quality. In one example, the first predetermined threshold corresponds to a time during which the specific nozzle is decap and does not fire. In another example, the first predetermined threshold corresponds to a time below which decap issues are considered likely to occur under given printing conditions in the specific nozzle. The given printing conditions may include a type of printing fluid or a time during which the specific nozzle have not fired before, among others. In this example, the first predetermined threshold may be determined thanks to historical decap data that is stored over time. The historical decap data is for example stored in the storage medium 402. The first predetermined threshold may correspond for example to a time below which, under the given printing conditions, the specific nozzle had decap issues 95% of the times according to the historical decap data. In another example, the first predetermined threshold is randomly chosen by a user of the printing system. In one example, the first predetermined threshold is less than 1.5 seconds. In one example, the first predetermined threshold is less than 1 second. In one example, the first predetermined threshold is less than 0.5 seconds. In one example, the first predetermined threshold is less than 0.1 seconds.

In some cases, decap time of the specific nozzle may be determined by printing a diagnostic plot. In one example, the diagnostic plot is obtained by a firing of the plurality of nozzles after an exposure to ambient air during a first predetermined time period to produce a first plot element, and a firing of the plurality of nozzles after an exposure to ambient air during a second predetermined time period to produce a second plot element. Exposing nozzles to ambient air during a predetermined time period has as a consequence that the nozzle is decapped during this time period. During either the first or the second time period, the nozzle is not capped and is not ejecting printing fluid. The first and the second time period may then be considered as first predetermined thresholds according to the definitions above. The firing of nozzles after an exposure to ambient air permits evaluating the decap time of the printing system in function of the amount of time during which the nozzles are decapped and exposed to ambient air. Printing a first and a second pattern element allows to build the diagnostic plot permitting the evaluation of decap.

FIG. 2 shows an example of diagnostic plot. The diagnostic plot of FIG. 2 is printed on the printed substrate by nozzles comprised on the printhead of the printing system. The printing system is for example a scanning printhead printing system, wherein the nozzles print the plot from left to right and from top to bottom. In FIG. 2, the first plot element comprises lines 111, 112, 113 and the following lines until line 120. In an example, successive lines or successive components of the diagnostic plot such as line 111 and line 112 are separated by a distance of between 1 and 10 mm. In an example, successive lines or successive components of the diagnostic plot such as line 111 and line 112 are separated by a distance of between 2 and 5 mm. In an example, successive lines or successive components of the diagnostic plot such as line 111 and line 112 are separated by a distance of between 2.5 and 3.5 mm. In this example, prior to printing the first plot element, nozzles have printed a solid area 110. Printing the area 110 permits wetting the nozzles prior to printing the first plot element. In this example the first plot element is a reference plot element which is printed with a minimal first predetermined time period. An example minimal time period is the time during which nozzles do not eject drops between area 110 and line 111 if the printhead to print substrate relative velocity is the operating velocity of the printing system, meaning that the printhead to print substrate velocity is not reduced when the nozzles travel without ejecting printing fluid between area 110 and line 111. After printing line 120, in this example the nozzles travel to print the second plot element. When printing the second plot element, the nozzles first print line 121, then line 122, 123 until line 130. Prior to printing line 121, the nozzles are exposed to ambient air without ejecting printing fluid during a second predetermined time. In this example, the second predetermined time is superior to the first predetermined time. In this example, the first plot element is a reference plot element whereby the nozzles are left exposed to ambient air without ejecting printing fluid during a minimal time to print the plot, while the second pattern element does introduce a decap time. In this case a comparison between the first and the second pattern elements permits evaluating if the decap time corresponding to the second predetermined time period has an impact on print quality. In this example, the lines 121 to 123 of the second pattern element are misaligned with respect to lines 111 to 113. This implies that the quality of printing is affected by decap issues. It follows that the second predetermined time period is greater than decap time, so that nozzles are unable to correctly fire printing fluid. After line 123, lines in the second pattern element are aligned with lines in the first pattern element. That means that the quality of printing is not affected by decap issues after line 123. This correction of decap issues may be due to the fact that the printing of lines 121 to 123 allows nozzles to get wet with the ejected printing fluid. Then, decap issues are limited.

In order to evaluate the decap time, the diagnostic plot may be scanned and transferred to a computer external to or integrated to the printing system. Scanning the diagnostic plot may be done by a sensor. The sensor collects decap data from the diagnostic plot in a digital form that may be treated by the computer in order to determine the decap time. To this effect, the computer may implement instructions for calculating the decap time from the scanned diagnostic plot. The instructions for calculating decap time from the scanned diagnostic plot may be stored for example in the storage medium 402.

In some cases, decap of the specific nozzle may be estimated. The estimation of decap time may be done directly at the computer. In one example, the estimation of decap time is implemented by a calculation module installed in the computer. The calculation module may be able to solve equations that allow obtaining an estimated decap time. In order to solve the equations, the arrangement of pixel data points in the raster image may be taken into account. As previously said, decap may be influenced by the presence of discontinuities in the colored areas of the graphical representation to which the raster image is associated. Therefore, equations solved by the calculation module may determine if such discontinuities exist in the raster image in order to estimate the decap time. In order to solve the equations, parameters of the printing system may also be taken into account. As previously said, examples of parameters of the printing system comprise a carriage speed, a firing frequency of nozzles, a position of nozzles in the printhead or a printing system type, among others. Environmental aspects, as for example humidity rate or temperature outside the printer system, may also be taken into account when solving the equations. A low humidity rate or a high temperature outside the printer may accelerate drying of the printing fluid, such that decap time is reduced. In an example, after solving the equations a digital diagnostic plot or table may be created. The digital diagnostic plot may be displayed on the screen of the computer such that the user may interpret results from a plot similar to the printed diagnostic plot of FIG. 2.

The method 100 comprises in block 103 modifying the received printing data by displacing the printing data of the specific data point in a direction corresponding to a direction opposite to the specific direction of movement in order to compensate for the decap time. As shown in FIG. 2, decap may create misalignment in printing data that is printed on a printing substrate. In printing systems where the printhead assembly is moved relative to the print substrate transport assembly, as scanning printhead printing systems, misalignment may appear in the direction of movement of the printhead assembly. In fact, since nozzles having decap issues may fire with loss of velocity, drops of printing fluid are expelled later than desired. In other words, drops of printing fluid are expelled when the specific nozzle, i.e. the nozzle for which decap issues are identified, has passed beyond a position of the print substrate on which drops should have fallen after firing. As a consequence, printing data is displaced in the specific direction of movement when printed, so that the printing quality is reduced.

Displacing the printing data of the specific data point in a direction corresponding to the direction opposite of the specific direction of movement limits such misalignment of printing data when printing. In order to displace the printing data of the specific data point, an internal printing system (IPS) may be used. The IPS is for example a workstation allowing modifying the raster image. In one example, the IPS comprises an image processing module. The image processing module allows modifying the raster image. The image processing module may for example allow displacing pixel data points of the raster image. In another example, the IPS may further comprise an image analysis module. The image analysis module may be used to display the raster image and to identify points that may be subjected to decap issues.

Two examples of how the modification of received printing data according to block 103 occurs will be now detailed in reference to FIGS. 3A to 3C and 4A to 4C.

FIG. 3A schematically represents a raster image 150 of a graphical representation. The raster image 150 is obtained according to block 101 of the method 100. The raster image 150 comprises pixel data points. The raster image 150 is intended to be printed by the printing system. In this example, the printing system is configured to print the raster image 150 from right to left. In other words the corresponding direction of movement as previously described is from right to left. A pixel data point 151 placed on the right of FIG. 3A is therefore intended to be the first pixel data point 150 printed. Since pixel data point 151 is the first pixel data point to be printed, the corresponding nozzle may present decap issues. In fact, this corresponding nozzle may have been decapped and not firing during a period of time longer than the decap time of this corresponding nozzle. The association of the pixel data points with a corresponding nozzle and with a corresponding direction of movement according to block 102 confirms that the corresponding nozzle presents decap issues. Then, this corresponding nozzle represents the specific nozzle as previously described, and the pixel data point 151 corresponds to the specific data point as previously described. In this example, decap issues would cause the pixel data point 151 to be printed later than desired. In order to get the pixel data point 151 printed at the desired time, the IPS may be used to displace the pixel data point 151 in a direction corresponding to the direction opposite of the specific direction of movement, the specific direction of movement in this example corresponding to the right-to-left direction. Therefore, as shown in FIG. 3B, the pixel data point 151 is displaced to the right. The pixel data point 151 is for example displaced to the right by one pixel. The displacement of the pixel data point 151 ensures that the specific nozzle fires the printing fluid earlier. This allows mitigating decap issues such that the printed image, schematically represented in FIG. 3C, substantially corresponds to the raster image 150.

The example of FIGS. 4A to 4C is similar to the example of FIGS. 3A to 3C. The example of FIGS. 4A to 4C differs from the example of FIGS. 3A to 3C in that a pixel data point 251 comprised in a raster image 250 is displaced to the right by two pixels instead of by one pixel, as shown in FIG. 4B. The rest of the explanations given for FIGS. 3A to 3C apply to this example. Therefore, they will not be repeated. The fact that in the example of FIGS. 4A to 4C the pixel data point 251 is displaced to the right by two pixels instead of by one pixel indicates that the decap issues in this example are more significant. In particular, the specific nozzle in this example may need more time in order to fire the printing fluid at the desired time. Then, the pixel data point 251 is displaced by two pixels in order to give more time to the specific nozzle to fire the printing fluid at the desired time.

From examples of FIGS. 3A to 3C and 4A to 4C it is clear that the displacement of the printing data of the specific data point in a direction corresponding to a direction opposite to the specific direction of movement may be by one pixel or by more than one pixel. A scope of the displacement may depend on a type of printing fluid employed by the printing system. In one example, decap time in a same nozzle may change depending on the color printing fluid expelled. This may be due to the chemical composition of the printing fluid which changes between the different colors. In an example, a same nozzle may have a decap time shorter when expelling magenta color printing fluid than when expelling black color printing fluid. Then, when expelling magenta color printing fluid it may be that the displacement of the printing data of the specific data point is greater than when expelling black color printing fluid. This displacement may be measured in number of pixels. In another example, a technology of the printing fluid may change decap performances of the printing fluid. For dye-sublimation printing fluids, decap time may be more important than in printing other fluidjet printing fluids because of a saturation boost that appears after sublimation of the printing fluid.

It should be noted that example method 100 may be applied to page-wide array printing systems. As previously said, in page-wide array printing systems the carriage assembly fixes the printhead assembly at a prescribed position relative to the print substrate transport assembly. However, in page-wide array printing systems, the print substrate may be advanced in a direction substantially perpendicular to the printhead assembly. Then, block 103 may be adapted to page-wide array systems by taking into account that the specific direction of movement is the specific direction of movement of a printing substrate passing by the page wide array printhead, the printing data of the specific data point being displaced in a direction opposite to the direction of the print substrate advance.

FIG. 5 illustrates a second example method 200 for mitigating decap in a printing system. Method 200 comprises a block 100 and a block 201. Block 100 corresponds to the example method 100 for mitigating decap in a printing system previously described. Therefore, block 100 will not be described again. Block 201 comprises further modifying the received printing data by adding at least an additional data point. A particular data point is associated with a particular direction of movement and with a particular nozzle. The particular direction of movement corresponds to the direction of the movement that the carriage assembly is inducing into the printhead assembly when the particular nozzle is intended to fire printing fluid, to the direction of displacement of a printing substrate, or to a combination of both. The particular nozzle is a nozzle having a decap time below a second predetermined threshold. The second predetermined threshold corresponds to a time below which the nozzles are unlikely to fire printing fluid. The additional data point may be preceding the particular data point along the particular direction of movement. Decap issues suppose then that the particular nozzle is not able to fire printing fluid before the particular data point, such that a data point would be missing. In this case, the second predetermined threshold is shorter than the first predetermined threshold. Adding the additional data point allows filling the space of missing data points, such that the quality of the printed image is improved.

Figure 6A:
FIG. 6A is a schematic illustration of a plurality of pixel data points associated to an example of graphical representation.
Figure 6B:
FIG. 6B is a schematic illustration of the plurality of pixel data points of the graphical representation of FIG. 4A modified by the example method of FIG. 5.
Figure 6C:
FIG. 6C is a schematic illustration of a printing of the graphical representation of FIG. 4A after being modified by the example method of FIG. 5.

FIGS. 6A to 6C illustrate an example of how the additional point is added to the printing data. The example of FIGS. 6A to 6C is similar to the example of FIGS. 3A to 3C. As in FIG. 3B, a pixel data point 351 comprised in a raster image 350 is displaced to the right by one pixel in order to mitigate decap in a first specific nozzle. The example of FIGS. 6A to 6C differs from the example of FIGS. 3A to 3C in that an additional data point 352 is added to the raster image 350, as shown in FIG. 6B. The additional data point 352 corresponds to a data point that was not included in the raster image 350. As previously said, adding data points to the raster image is useful when decap time of the particular nozzle is below a time below which the nozzles are unlikely to fire printing fluid. In particular, adding the additional data point 352 allows the particular nozzle to get wet when trying to print the additional data point 352. By getting wet, the nozzle, initially unable to fire printing fluid, is again able to fire printing fluid when printing the pixel data point 351. At the end, as shown in FIG. 6C, no additional point may appear in the printed image.

The rest of the explanations given for FIGS. 3A to 3C apply to the example of FIGS. 6A to 6C. Therefore, they will not be repeated.

Once example methods 100 or 200 have been carried out, the printing data associated to the graphical representation is transmitted to the printing system. In an example, the printing data is transmitted to a printing engine. In an example, the printing data is transmitted to the printing engine by the IPS. The printing engine includes hardware and software required for launching printing. The printing engine may for example command the firing of nozzles and the movement of the printhead assembly. The printing data transmitted to the printing system corresponds to the raster image in which specific data points have been displaced in the direction corresponding to the direction opposite to the specific direction of movement, and in which additional data points have been eventually added. That is to say, the printing data transmitted to the printing system corresponds to the printing data of the examples of FIGS. 3B, 4B and 6B. The printing data transmitted to the printing system is therefore adapted to limit decap issues in printing.

It should be noted that, in an example, methods 100 and 200 may be carried out directly in the printing engine.

Figure 7:
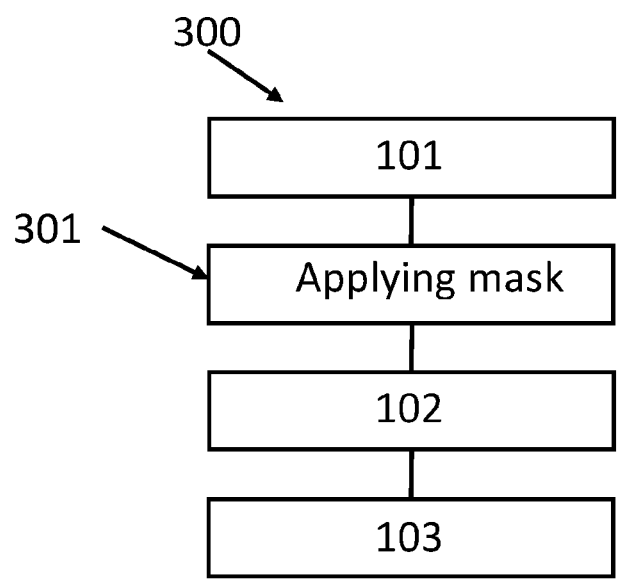
FIG. 7 is a block diagram of a third example method for mitigating decap in a printing system according to the present disclosure.

FIG. 7 illustrates a third example method 300 for mitigating decap in a printing system. Method 300 comprises blocks 101 to 103 and a block 301. Blocks 101 to 103 correspond to the blocks 101 to 103 of the example method 100 for mitigating decap in a printing system previously described. Therefore, blocks 101 to 103 will not be described again. In another example not illustrated, method 300 further comprises block 201 of to the example method 200 for mitigating decap in a printing system previously described. Therefore, block 201 will not be described again.

Block 301 comprises applying at least one mask to the printing data. The mask may be applied for example when the printing system is a scanning printhead printing system. In particular, the mask may be applied when the printing system is a bidirectional scanning printhead printing system. The mask allows determining how many times corresponding nozzles move over a same portion of the print substrate. In an example, corresponding nozzles move twice over the same portion of the print substrate. That means that corresponding nozzles do a back and forth movement over the same portion of the print substrate. In an example, corresponding nozzles move four times over the same portion of the print substrate. That means that corresponding nozzles do two back and forth movements over the same portion of the print substrate. The mask further allows determining during which of the movements, each corresponding nozzle will fire printing fluid. When the corresponding nozzles operate a single back and forth movement, each nozzle may fire while moving in the backward direction or in the forward direction. When the corresponding nozzles operate two back and forth movements, each nozzle may fire while moving in the backward direction for the first or the second time, or while moving in the forward direction for the first or the second time. In one example, the mask is applied prior to associating the at least some data points with the corresponding direction of movement. In one example, the mask is applied before transmitting printing data to the printing engine. In one example, the mask is applied when printing data is already in the printing engine.

When the nozzles fire several types of printing fluid, a respective mask for each type of printing fluid may be applied. The mask for each type of printing fluid may be applied prior to associating the data points with the corresponding direction of movement. In an example nozzle that fires several color printing fluids, a mask may be applied for each color printing fluid.

When such masking takes place, and due to the fact that such masking defines the specific direction of movement corresponding to the firing of a specific nozzle, such masking should be taken into account in order to correctly modify the received printing data as per this disclosure.

Figure 8:
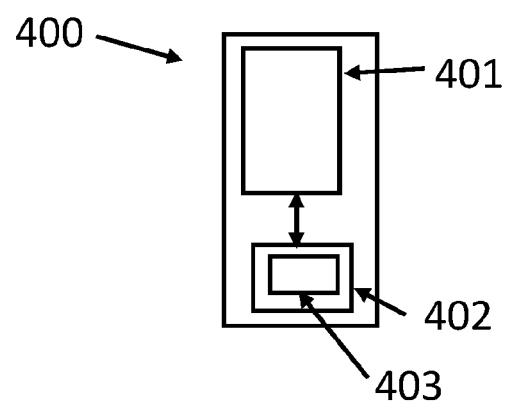
FIG. 8 is a block diagram of an example printing system controller according to the present disclosure.

Any of the example methods hereby described may be implemented for example on a printing system controller 400 as illustrated on FIG. 8. Example printing system controller 400 comprises a processor 401 and a storage medium 402 coupled to the processor 401. In another example printing system controller 400 the processor 401 and several storage media 402 may be provided.

The processor 401 performs operations on printing data. The processor 401 may be a central processing unit. In an example, the processor 401 comprises an electronic logic circuit or core and a plurality of input and output pins for transmitting and receiving data.

The storage medium 402 may include any electronic, magnetic, optical, or other physical storage device that stores executable instructions. Storage medium 402 may be, for example, Random Access Memory (RAM), an Electrically-Erasable Programmable Read-Only Memory (EEPROM), a storage drive, an optical disk, and the like. Data storage 402 is coupled to the processor 401.

The printing system controller 400 further comprises an instruction set 403. The instruction set 403 cooperates with the processor 401 and the storage medium 402. In an example, instruction set 403 comprises executable instructions for the processor 401, the executable instructions being encoded in storage medium 402.

The instruction set 403 cooperates with the processor 401 and the storage medium 402 to receive printing data associated to the graphical representation. As previously explained, the printing data comprises representation data points.

The instruction set 403 may also cooperate with the processor 401 and the storage medium 402 to associate at least some data points of the representation data points with the corresponding nozzle and with the corresponding direction of movement.

The instruction set 403 may further cooperate with the processor 401 and the storage medium 402 to associate the at least one specific data point of the at least some data points with the specific direction of movement and with the specific nozzle. As previously said, the specific nozzle has a decap time below the first predetermined threshold.

The instruction set 403 may further cooperate with the processor 401 and the storage medium 402 to operate an image processing module to modify the received printing data by displacing the printing data of the specific data point in a direction corresponding to a direction opposite to the specific direction of movement.

The present disclosure also relates to a non-transitory machine-readable or computer readable storage medium. An example of computer readable storage medium is storage medium 402. The computer readable storage medium is encoded with instructions comprised in the instructions set 403 and executable by a processor such as processor 401. The instructions, when executed, direct a processor to perform a method comprising:

receiving printing data associated to the representation, the printing data comprising representation data points;

associating at least a specific data point of the representation data points with a specific direction of movement and with a specific nozzle, the specific nozzle having a decap time below a first predetermined threshold; and compensating for the decap time below the first predetermined threshold by displacing the printing data of the specific data point in a direction corresponding to a direction opposite to the specific direction of movement in order to compensate for the decap time.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method for mitigating decap in a printing system, the printing system comprising a plurality of nozzles, the method comprising:

receiving printing data associated to a graphical representation, the printing data comprising pixel data points;

associating at least some data points of the pixel data points with a corresponding nozzle and with a corresponding direction of movement, and whereby at least a specific data point of the at least some data points is associated with a specific direction of movement and with a specific nozzle, the specific nozzle having a decap time below a first predetermined threshold; and modifying the received printing data by displacing the printing data of the specific data point in a direction corresponding to a direction opposite to the specific direction of movement in order to compensate for the decap time.

2. The method according to claim 1, comprising further modifying the received printing data by adding at least an additional data point.

3. The method according to claim 2, whereby a particular data point is associated with a particular direction of movement and with a particular nozzle, the particular nozzle having a decap time below a second predetermined threshold, the second predetermined threshold being shorter than the first predetermined threshold, whereby the additional data point is preceding the particular data point along the particular direction of movement.

4. The method according to claim 1, whereby the decap time of the specific nozzle is determined by printing a diagnostic plot comprising:
firing of the plurality of nozzles after an exposure to ambient during a first predetermined time period to produce a first plot element, and
firing of the plurality of nozzles after an exposure to ambient during a second predetermined time period to produce a second plot element.

5. The method according to claim 1, the method comprising estimating the decap time of the specific nozzle.

6. The method according to claim 1, whereby the displacing the printing data of the specific data point in a direction corresponding to a direction opposite to the specific direction of movement in order to compensate for the decap time comprises displacing by one pixel.

7. The method according to claim 1, whereby the displacing the printing data of the specific data point in a direction corresponding to a direction opposite to the specific direction of movement in order to compensate for the decap time comprises displacing by more than one pixel.

8. The method according to claim 1, whereby the modifying of the received printing data is depending on a type of printing fluid employed by the printing system.

9. The method according to claim 1, wherein the printing system is a scanning printhead printing system.

10. The method according to claim 9 further comprising applying at least one mask to the printing data prior to associating the at least some data points with the corresponding direction of movement.

11. The method according to claim 10, the printing system comprising a plurality of types of printing fluids, the method comprising applying a respective mask for each type of printing fluid prior to associating the at least some data points with the corresponding direction of movement.

12. The method according to claim 1, wherein the printing system is a page wide array printing system.

13. The method according to claim 1, wherein the printing system is a 3D printing system.

14. A printing system controller comprising a processor, a storage medium coupled to the processor and an instruction set to cooperate with the processor and the storage medium to:
receive printing data associated to a graphical representation, the printing data comprising representation data points;
associate at least some data points of the representation data points with a corresponding nozzle and with a corresponding direction of movement,
associate at least a specific data point of the at least some data points with a specific direction of movement and with a specific nozzle, the specific nozzle having a decap time below a first predetermined threshold; and
operate an image processing module to modify the received printing data by displacing the printing data of the specific data point in a direction corresponding to a direction opposite to the specific direction of movement.

15. A computer-readable storage medium storing instructions that, when executed, direct a processor to perform a method comprising:
receiving printing data associated to a representation, the printing data comprising representation data points;
associating at least a specific data point of the representation data points with a specific direction of movement and with a specific nozzle, the specific nozzle having a decap time below a first predetermined threshold; and
compensating for the decap time below the first predetermined threshold by displacing the printing data of the specific data point in a direction corresponding to a direction opposite to the specific direction of movement in order to compensate for the decap time.

* * * * *